Figure 1:
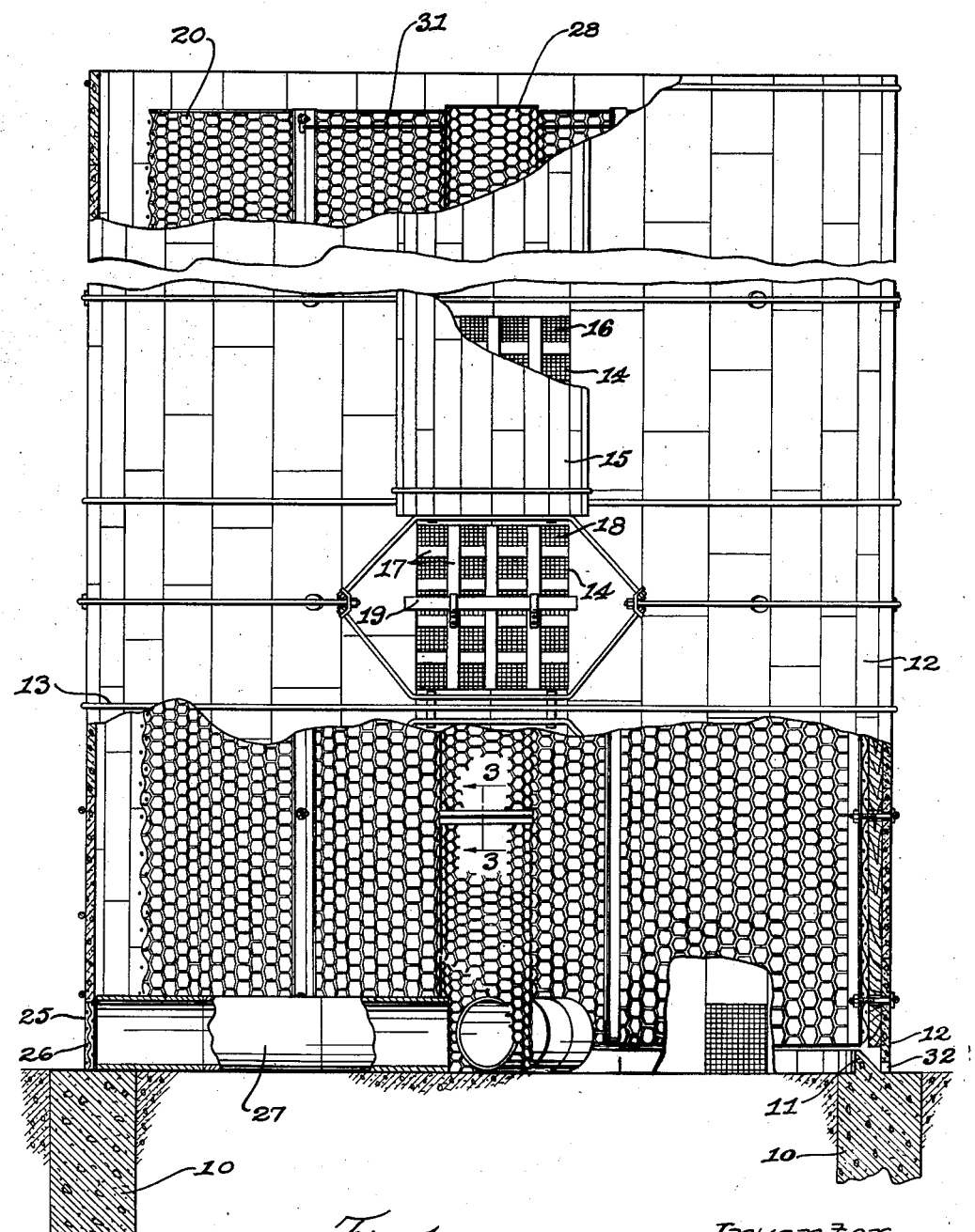

Oct. 29, 1940.  W. O. BRASSERT  2,219,468
HAY STORAGE SILO
Filed May 27, 1938  2 Sheets-Sheet 1

Inventor
Walter O. Brassert,
By Minturn & Minturn
Attorneys

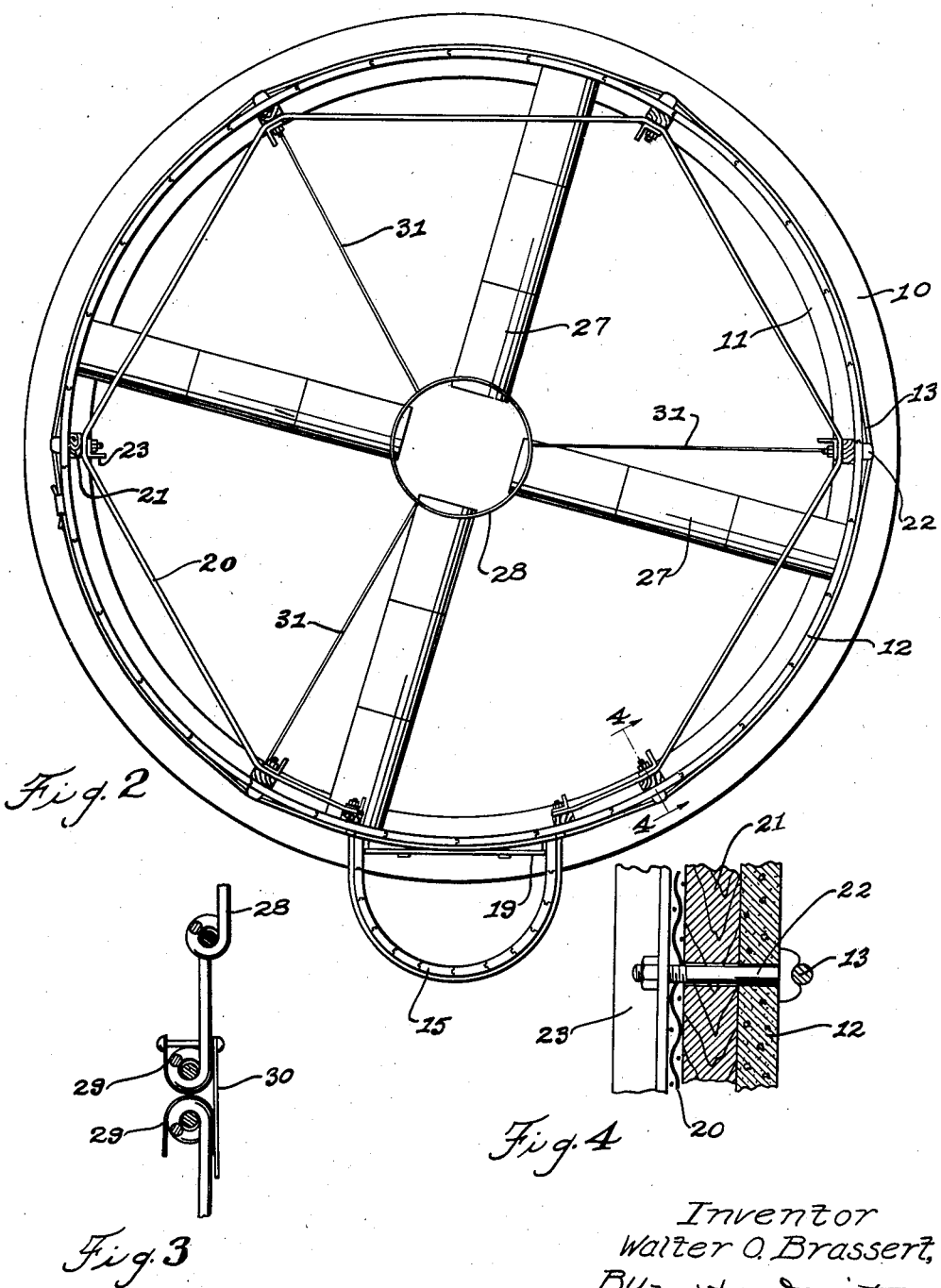

Patented Oct. 29, 1940

2,219,468

UNITED STATES PATENT OFFICE 2,219,468

HAY STORAGE SILO

Walter O. Brassert, Bloomfield, Ind.

Application May 27, 1938, Serial No. 210,297

5 Claims. (Cl. 98—56)

This invention relates to the art of silos and has for one of its primary objects the provision of a silo structure which will permit use thereof for both the storage of corn ensilage and the like in the usual manner and with the introduction of certain elements, permit use of the same structure for the storage of chopped hay and the like.

By reason of the fundamental use of the structural wall for both purposes, a great degree of economy is secured by the farmer since he may interchangeably employ the same identical wall structure without in any way detracting from the ability to keep the contents in a good, usable and wholesome condition for feeding purposes.

A further primary object of the invention is to provide a very simple interlining structure which may be added to the primary concrete stave wall structure with a minimum of expense and labor.

These and many other objects and advantages of the invention will become apparent to those versed in the art in the following description of one particular form of the invention as illustrated in the accompanying drawings, in which Fig. 1 is a side elevation in partial section of a structure embodying the invention;

Fig. 2, a top plan view;

Fig. 3, a detail in vertical section on the line 3—3 in Fig. 1; and

Fig. 4, a detail in vertical section on the line 4—4 in Fig. 2.

Like characters of reference indicate like parts throughout the several views in the drawings.

A suitable foundation 10 is constructed, herein shown as a concrete wall the top of which terminates substantially at the ground level. Preferably this foundation 10 is provided with an internal, upwardly extending shoulder 11 around which on the outer side thereof are placed in abutting upright relation a plurality of individual staves 12. In the form herein shown, these staves are of comparatively short lengths and are arranged in a stepped manner spirally around the silo, the vertical edges being of tongue and grooved structure normally cemented together. The staves are encircled by the usual bands or hoops 13 to give the cylindrical structure extreme rigidity and to reinforce it against internal pressure.

As in the usual silo construction, a plurality of openings 14 are left in spaced apart vertical alignment on one side of the silo as a means for permitting unloading of the silo as the level of the contents is lowered. An external chute 15, also made out of individual, short length staves, is formed outside of this column of doors, the lower end of this chute 15 terminating at a distance above the ground level sufficiently high as will permit a feed cart or the like to be pushed thereunder as well as to permit the entrance into the lower end of that chute of the operator.

When the silo is to be employed for the usual corn ensilage or any ensilage material, these openings 14 are covered in the usual and well known manner by a solid type door. When the structure is to be employed for the storage of dry feed such as chopped hay which demands a circulation of air for control of the moisture content, these openings are preferably covered by foraminous doors 16 constructed in any suitable manner, the present form being shown as comprising a plurality of crossed bars 17 carrying a wire screen 18 therebehind. In any event, the door is secured in position originally in any suitable manner such as by a cross bar 19 engaging on the outside of the silo wall by its ends and interengaging the door therebetween.

For use in storing the dry materials, such as chopped hay, a lining or spacer wall 20 is employed and this wall must be also of a foraminous nature. Preferably this wall is made out of a coarse woven wire netting such as is commonly employed in fencing against chickens and the like. Spaced around the inside of the wall of the silo are a plurality of vertical strips 21 preferably made out of wood. Each of these strips 21 has a plurality of bolts 22 passing horizontally therethrough in vertically spaced arrangement. Each bolt, Fig. 4, is carried through the stave 12 to have its head bear against the outside face of the stave and to have the bolt proper carried through the strip 21 and extend inwardly a distance therefrom. These bolts 22 are removable, but are normally held in position by means of the hoop 13 passing over the heads of those bolts in the level of that particular hoop. The heads of the bolts are preferably formed to have horizontally grooved channels to receive the hoop and thereby permit the hoop to draw the bolt head snugly against the stave and prevent its turning as well as to seal up the hole through the stave. It is not necessary to provide a bolt at each hoop level, particularly in the lower part of the silo where the hoops are generally spaced closer together than they are on the upper part.

Starting at one of these strips 21, the wire netting 20 is engaged thereagainst by means of a bar 23 pushed against the outside of the netting and receiving the inner ends of the bolts therethrough so that the netting is clamped between the bar 23 and the strip 21, suitable nuts being fixed over the inner ends of the bolts 22 to effect this clamping operation. While not necessarily so, these bars 23 are preferably made out of angle iron so as to secure a clamping action of the netting uniformly between the spaced apart bolts. The netting is then carried to each strip 21 appearing around the inside of the wall and clamped thereto by the respective bar 23. This operation is continued until the netting is carried entirely around the wall, as indicated in Fig. 2.

The strips 21 are spaced sufficiently apart as will permit the wire netting to be carried on chordal lines without that netting being stretched to contact the inside of the silo wall therebetween under pressure of the material placed within the netting. This arrangement of the netting within the concrete silo wall provides for a plurality of vertically disposed air channels or ducts from bottom to top of the silo.

When the silo is being erected, a plurality of openings 25 is left in the lower end of the silo immediately adjacent the foundation 10 and these openings are protected with a suitable wire screen 26. From part of these openings 25 a relatively small conduit 27, ordinary tile being suitable, leads to the center of the silo. In the center of the silo receiving the discharge ends of these conduits 27 is a vertically disposed cylindrical foraminous column 28. This column 28 is preferably made in sections for ease in handling the construction and for assembly and disassembly as the silo may be employed for different purposes. This central column 28 is preferably held to a minimum in diameter in order to permit as great a possible storage space within the silo inside of the netting 20. The purpose of this column is to receive air through the openings 25 and conduct it upwardly through the central part of the silo to provide ventilation. Intermediate openings 25 permit entrance of air through the lower end of the silo between the strips 21 so as to permit upward passage of air between the solid silo wall and the netting 20 so as to provide ventilation around the outer sides of the stored material and at the same time protect those sides by reason of the presence of the solid wall from the elements.

The central column 28, while as above indicated may be made in any suitable form, may be formed from wire netting having a metal binding 29 at its top and bottom edges. Fingers 30, Fig. 3, may be secured to one of these binding edges on the inside to fit down within the column against the binding 29 of the section thereunder so as to align the sections and prevent slippage laterally therebetween. The upper end of the column 28 is preferably aligned by tie rods 31 extending from the column to the selected strips 21, as indicated in Fig. 2.

It is to be noted that by reason of the shoulder 11 being provided inside of the staves 12, Fig. 1, there is formed a gutter to extend entirely around the silo. This gutter serves as a means to collect moisture of condensation that may run down on the inside of the silo wall. Drainage of this gutter is secured through small holes 32 left in the lower ends of these staves. Of course, when the silo is to be employed without the interlining of wire netting, the openings 25 are closed off from the inside by simply inserting concrete staves in place of the wire netting which is removed, and the holes 32 are preferably plugged up also. This returns the silo to the solid air excluding type again.

While I have herein shown and described my invention in the one form as now best known to me, it is obvious that structural changes may be employed without departing from the spirit of the invention, and I, therefore, do not desire to be limited to that precise form beyond the limitations as may be imposed by the following claims.

I claim:

1. A substantially cylindrical silo having an external airtight wall formed of concrete staves, external encircling hoops, a removable foraminous wall within the stave wall and carried therearound in a plurality of chordal planes to define a storage space polygonal in cross-section with air columns between the foraminous wall and the stave wall segmented in cross-section, and means for anchoring the foraminous wall along its vertices to the stave wall, said means comprising vertical clamping members continuous from top to bottom of the foraminous wall defining said vertices and bolts carried by the staves and engaging said members to pull the foraminous wall toward the stave wall, said clamping members consisting of a pair of bars one on each side of the foraminous wall and the outer bar being in contact with the silo external wall.

2. A substantially cylindrical silo having an external airtight wall formed of concrete staves, external encircling hoops, a removable foraminous wall within the stave wall and carried therearound in a plurality of chordal planes to define a storage space polygonal in cross-section with air columns between the foraminous wall and the stave wall segmented in cross-section, and means for anchoring the foraminous wall along its vertices to the stave wall, said means comprising vertical clamping members defining said vertices and bolts carried by the staves and engaging said members to pull the foraminous wall toward the stave wall, said bolts being positioned to have heads externally of the staves to be held against the staves by hoops passing thereover.

3. A substantially cylindrical silo having an external airtight wall formed of concrete staves, external encircling hoops, a removable foraminous wall within the stave wall and carried therearound in a plurality of chordal planes to define a storage space polygonal in cross-section with air columns between the foraminous wall and the stave wall segmented in cross-section, and means for anchoring the foraminous wall along its vertices to the stave wall, said means comprising vertical clamping members defining said vertices and bolts carried by the staves and engaging said members to pull the foraminous wall toward the stave wall, said bolts being positioned to have heads externally of the staves to be held against the staves by hoops passing thereover, and means associated with said bolt heads and cooperating with said hoops to restrain the bolts against turning.

4. A substantially cylindrical silo having an external airtight wall formed of concrete staves, external encircling hoops, a removable foraminous wall within the stave wall and carried therearound in a plurality of chordal planes to define a storage space polygonal in cross-section with air columns between the foraminous wall and the stave wall segmented in cross-section, and means for anchoring the foraminous wall along its vertices to the stave wall, a foundation on which said stave wall rests, and a shoulder extending upwardly from the foundation within the stave wall to define a gutter therearound between the stave and foraminous walls, and means for discharge of liquids from the gutter.

5. A substantially cylindrical silo having an external airtight wall formed of concrete staves, external encircling hoops, a removable foraminous wall within the stave wall and carried therearound in a plurality of chordal planes to define a storage space polygonal in cross-section with air columns between the foraminous wall and the stave wall segmented in cross-section, and means for anchoring the foraminous wall along its vertices to the stave wall, said means comprising a pair of vertically disposed members engaging the foraminous wall therebetween and bolt means for drawing the engaging members toward the wall whereby a stretching action is set up on the foraminous wall between adjacent vertices tending to push the staves therebetween outwardly against the encircling hoops.

WALTER O. BRASSERT.